United States Patent
Park et al.

(10) Patent No.: US 11,848,455 B2
(45) Date of Patent: Dec. 19, 2023

(54) BATTERY MODULE

(71) Applicant: LG Chem, Ltd., Seoul (KR)

(72) Inventors: Jinwoo Park, Daejeon (KR); Tae Geun Kim, Daejeon (KR)

(73) Assignee: LG Energy Solution, Ltd.

( * ) Notice: Subject to any disclaimer, the term of this patent is extended or adjusted under 35 U.S.C. 154(b) by 587 days.

(21) Appl. No.: 17/058,269

(22) PCT Filed: Dec. 4, 2019

(86) PCT No.: PCT/KR2019/017025
§ 371 (c)(1),
(2) Date: Nov. 24, 2020

(87) PCT Pub. No.: WO2020/116937
PCT Pub. Date: Jun. 11, 2020

(65) Prior Publication Data
US 2021/0218097 A1    Jul. 15, 2021

(30) Foreign Application Priority Data

Dec. 6, 2018    (KR) .......................... 10-2018-0156149

(51) Int. Cl.
*H01M 50/204*    (2021.01)
*H01M 50/249*    (2021.01)
(Continued)

(52) U.S. Cl.
CPC ....... *H01M 50/204* (2021.01); *H01M 10/425* (2013.01); *H01M 50/211* (2021.01);
(Continued)

(58) Field of Classification Search
CPC ............. H01M 50/204; H01M 50/249; H01M 50/264; H01M 50/244; H01M 50/505;
(Continued)

(56) References Cited

U.S. PATENT DOCUMENTS 5,992,681 A    11/1999    Byrd et al.
2005/0201904 A1    9/2005    Stripling et al.
(Continued)

FOREIGN PATENT DOCUMENTS

CN    101188337 A    5/2008
CN    105024020 A    11/2015
(Continued)

OTHER PUBLICATIONS

Search Report dated Jul. 20, 2022, from the Office Action for Chinese Application No. 201980054153.5 dated Aug. 1, 2022, pp. 1-3.

(Continued)

*Primary Examiner* — James M Erwin
(74) *Attorney, Agent, or Firm* — Lerner David LLP (57) ABSTRACT

A battery module according to the present disclosure includes: a cell assembly that includes at least one battery cell; an upper plate that covers one side of the cell assembly, and includes a hinge pin adjacent at least one corner thereof; and a bus-bar frame that covers a neighboring side of the one side of the cell assembly, covered by the upper plate, and coupled to the upper plate by including a hinge coupling portion that is coupled with the hinge pin, wherein the hinge coupling portion comprises a hinge pin receiving portion where the hinge pin is received and a hinge pin cover portion that covers the hinge pin, and one of the hinge pin and the hinge coupling portion comprises a coupling protrusion portion, and the other comprises a coupling groove portion corresponding to the coupling protrusion portion.

15 Claims, 6 Drawing Sheets

(51) Int. Cl.
*H01M 50/264* (2021.01)
*H01M 50/244* (2021.01)
*H01M 50/505* (2021.01)
*H01M 50/503* (2021.01)
*H01M 10/42* (2006.01)
*H01M 50/50* (2021.01)
*H01M 50/284* (2021.01)
*H01M 50/211* (2021.01)
*H01M 50/262* (2021.01)

(52) U.S. Cl.
CPC ....... *H01M 50/244* (2021.01); *H01M 50/249* (2021.01); *H01M 50/262* (2021.01); *H01M 50/264* (2021.01); *H01M 50/284* (2021.01); *H01M 50/50* (2021.01); *H01M 50/503* (2021.01); *H01M 50/505* (2021.01); *H01M 2220/20* (2013.01)

(58) Field of Classification Search
CPC ............. H01M 50/503; H01M 10/425; H01M 2220/20
USPC .............................................. 429/7
See application file for complete search history.

(56) References Cited

U.S. PATENT DOCUMENTS

| | | |
|---|---|---|
| 2007/0102390 A1 | 5/2007 | Hoepner et al. |
| 2008/0124626 A1 | 5/2008 | Murata et al. |
| 2014/0375189 A1 | 12/2014 | Kim et al. |
| 2015/0111089 A1* | 4/2015 | Seo ...................... H01M 50/211 429/156 |
| 2015/0303438 A1 | 10/2015 | Choo et al. |
| 2016/0093856 A1* | 3/2016 | DeKeuster .......... H01M 50/262 429/156 |
| 2016/0233465 A1 | 8/2016 | Lee et al. |
| 2016/0372734 A1 | 12/2016 | Berthe De Pommery et al. |
| 2018/0090920 A1* | 3/2018 | Shoji ..................... H01M 10/48 |
| 2018/0205058 A1 | 7/2018 | Lee et al. |
| 2018/0342717 A1 | 11/2018 | Shoji et al. |
| 2019/0348720 A1 | 11/2019 | Oh et al. |
| 2019/0389318 A1 | 12/2019 | Lee et al. |
| 2020/0014005 A1 | 1/2020 | Lee et al. |

FOREIGN PATENT DOCUMENTS

| | | |
|---|---|---|
| CN | 106920904 A | 7/2017 |
| JP | 2006138362 A | 6/2006 |
| JP | 2015006436 A | 1/2015 |
| JP | 2015204928 A | 11/2015 |
| KR | 200434422 Y1 | 12/2006 |
| KR | 20130039572 A | 4/2013 |
| KR | 20170087084 A | 7/2017 |
| KR | 101844852 B1 | 4/2018 |
| KR | 101844856 B1 | 4/2018 |
| KR | 20180051058 A | 5/2018 |
| KR | 20180078777 A | 7/2018 |
| KR | 20180078778 A | 7/2018 |

OTHER PUBLICATIONS

Search report from International Application No. PCT/KR2019/017025, dated Mar. 23, 2020.
Search Report dated Mar. 14, 2023, from the Office Action for Chinese Application No. 201980054153.5 dated Mar. 18, 2023, 2 pages. [See p. 1, categorizing the cited references].
Extended European Search Report including Written Opinion for Application No. 19893165.1 dated Dec. 13, 2021, pp. 1-7.

* cited by examiner

BATTERY MODULE

CROSS-REFERENCE TO RELATED APPLICATIONS

This application is a national phase entry under 35 U.S.C. § 371 of PCT/KR2019/017025, filed on Dec. 4, 2019, which claims priority to and the benefit of Korean Patent Application No. 10-2018-0156149 filed in the Korean Intellectual Property Office on Dec. 6, 2018, the entire contents of which are each incorporated herein by reference.

TECHNICAL FIELD

The present invention relates to a battery module, and more particularly, it relates to a battery module including a bus-bar frame where a bus bar is installed, and an upper plate coupled with the bus-bar frame.

BACKGROUND ART

Rechargeable batteries having high application characteristics and electrical characteristics such as high energy density according to their products are widely applied to battery vehicles, hybrid vehicles, and electric power storage devices driven by electric driving sources as well as portable devices. These rechargeable batteries are attracting attention as new energy sources for improving environmental-friendliness and energy efficiency in that they do not generate any by-products of energy use as well as their primary merit, which can drastically reduce the use of fossil fuels.

The battery pack applied to the battery vehicle has a structure in which a plurality of cell assemblies including a plurality of unit cells are coupled in series to obtain high power. The unit cell can be repeatedly charged and discharged by electrochemical reaction between constituent elements, including positive and negative current collectors, separators, active materials, and electrolyte solutions.

Meanwhile, as the need for a large capacity structure increases, including the use of energy storage sources, a demand for battery packs having a multi-module structure in which a plurality of rechargeable batteries formed by assembling a plurality of battery modules coupled in series and/or in parallel with each other has increased.

In general, when a battery pack is formed by coupling a plurality of battery cells in series/in parallel, a battery module formed of at least one battery cell is formed first, and other constituent elements are added by using the at least one battery module, thereby forming a battery pack. The number of battery modules included in the battery pack or the number of battery cells included in the battery module may be variously set according to a required output voltage or charge and discharge capacity. The battery module set as stated above includes a bus bar assembly that electrically connects a plurality of battery cells and electrode leads of the plurality of battery cells.

Conventionally, the bus bar assembly has a structure in which a bus bar and a bus-bar frame are coupled, and in this case, the bus-bar frame is assembled with an upper plate that covers the top surface of the battery cells. However, a part where the bus-bar frame and the upper plate are assembled may be separated during the process or during the movement of the module, and in this case, problems such as tearing of a flexible printed circuit board formed over the bus-bar frame and upper plate may occur. In addition, during the assembly process of the bus-bar frame and upper plate, the bus-bar frame pivots more than necessary, causing damage to the internal cell assembly, and there is a need for a structure that can prevent such problems.

DISCLOSURE

Technical Problem

The problem to be solved by the present invention is to provide a battery module that can prevent damage to devices due to separation of a bus-bar frame and an upper plate, and also enable easy assembling of the bus-bar frame and the upper plate.

However, the problems to be solved by the exemplary embodiments of the present invention are not limited to the above-described problems, and can be variously extended in a range of technical ideas included in the present invention.

Technical Solution

A battery module according to an exemplary embodiment of the present invention includes: a cell assembly that includes at least one battery cell; an upper plate that covers one side of the cell assembly, and includes a hinge pin at at least one corner thereof; and a bus-bar frame that covers a neighboring side of the one side of the cell assembly, covered by the upper plate, and that is coupled to the upper plate by including a hinge coupling portion that is coupled with the hinge pin, wherein the hinge coupling portion comprises a hinge pin receiving portion where the hinge pin is received and a hinge pin cover portion that covers the hinge pin, and one of the hinge pin and the hinge coupling portion comprises a coupling protrusion portion, and the other comprises a coupling groove portion corresponding to the coupling protrusion portion.

The hinge pin cover portion may completely cover the hinge pin.

The coupling groove portion may include a main coupling groove portion, and a preliminary coupling groove portion disposed at a distance apart from the main coupling groove portion.

The hinge pin may include the coupling protrusion portion, and the hinge coupling portion may include the main coupling groove portion and the preliminary coupling groove portion.

The hinge coupling portion may have a circular-shaped cross-section, and a distance between the main coupling groove portion and the preliminary coupling groove may be less than ¼ of a circular arc of the circular-shaped cross-section.

The bus-bar frame may be pivotably coupled to the upper frame by the hinge coupling portion.

Pivoting of the bus-bar frame may be limited by coupling between the coupling protrusion portion and the main coupling groove portion.

The bus-bar frame may be perpendicularly coupled to the upper plate while the coupling protrusion portion and the main coupling groove portion are in a coupled state.

The cell assembly may be mounted below the upper plate in a preliminary coupling state in which the coupling protrusion portion and the preliminary coupling groove portion are coupled, and the bus-bar frame may be assembled to cover the neighboring side of the one side of the cell assembly by pivoting of the bus-bar frame.

The hinge pin receiving portion and the hinge pin cover portion may be coupled by a snap fit structure.

The battery module may further include a flexible printed circuit board formed on a top surface of the upper plate, wherein the flexible printed circuit board may extend from one side of the upper plate adjacent to the hinge coupling portion to one side of the bus-bar frame passing one side adjacent to the hinge coupling portion.

The hinge coupling portion may include the coupling protrusion portion, and the hinge pin may include the main coupling groove portion and the preliminary coupling groove portion.

The hinge coupling portion may have a circular-shaped cross-section, and a distance between the main coupling groove portion and the preliminary coupling groove may be less than ¼ of a circular arc of the circular-shaped cross-section.

A battery pack according to another exemplary embodiment of the present invention may include the least one battery module, and a pack case that packages the at least one battery module.

A device according to another exemplary embodiment of the present invention may include the at least one battery pack.

Advantageous Effects

According to the exemplary embodiments, the flexible printed circuit board and the like can be prevented from being damaged due to separation of the bus-bar frame and the upper place because the hinge pin is completely covered, and precise assembly of the bus-bar frame and the upper plate can be easily carried out by coupling of the coupling protrusion portion and the coupling groove portion formed in the hinge coupling portion and the hinge pin.

DESCRIPTION OF THE DRAWINGS

FIG. 3 is a cross-sectional view of FIG. 1, taken along the line III-III' in

FIG. 2.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In addition, unless explicitly described to the contrary, the word "comprise", and variations such as "comprises" or "comprising" will be understood to imply the inclusion of stated elements but not the exclusion of any other elements.

Figure 1:
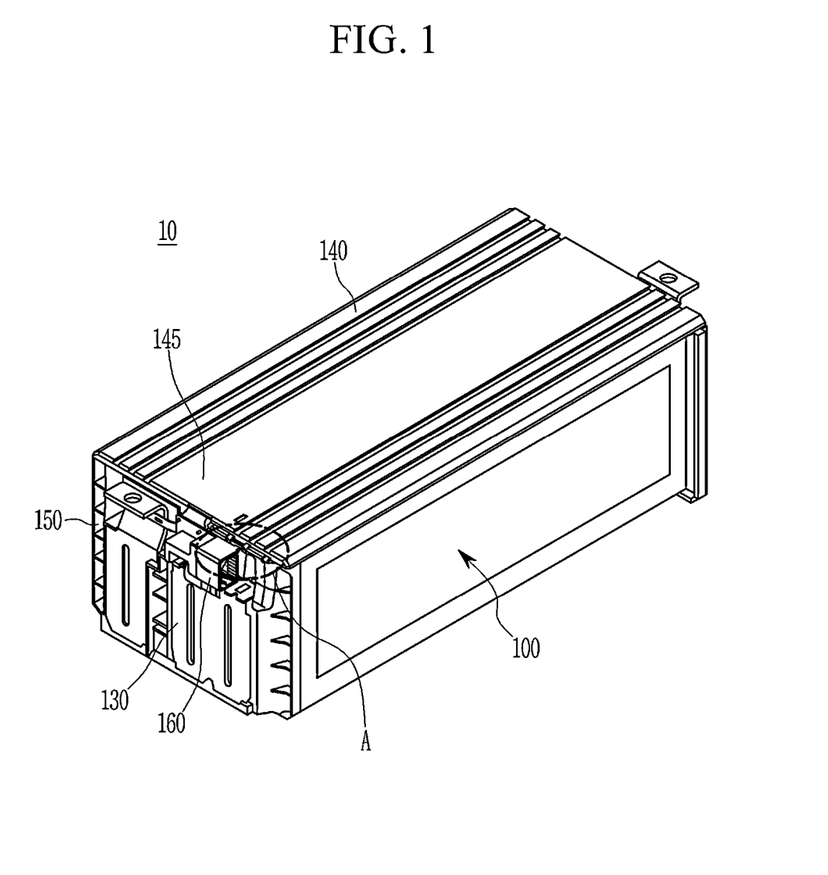
FIG. 1 is a perspective view of a battery module according to an exemplary embodiment of the present invention.

Further, in this specification, the phrase "on a plane" means viewing a target portion from the top, and the phrase "on a cross-section" means viewing a cross-section formed by vertically cutting a target portion from the side. FIG. 1 is a perspective view of a battery module according to an exemplary embodiment of the present invention.

Referring to FIG. 1, a battery module 10 includes a cell assembly 100, an upper plate 140 that covers the cell assembly 100, and a bus-bar frame 150 that is coupled to the upper plate 140 and covers at least one side of the cell assembly 100. In addition, the cell assembly 100 and the upper plate 140 are received in a module case (not shown), and the bus-bar frame 150 covers an opening of the module case.

The cell assembly 100 is formed of a plurality of battery cells, and may be formed, for example, as a pouch-type rechargeable battery. The plurality of battery cells are stacked inside the cell assembly 100, and they may be electrically connected to each other. Each of the battery cells may include an electrode assembly, a battery case that receives the electrode assembly, and an electrode lead 105 (shown in FIG. 4) that protrudes outward from the battery case and is electrically connected with the electrode assembly. The electrode assembly may include a positive electrode plate, a negative electrode plate, and a separator, and may adopt an electrode assembly having a known structure, and therefore no further detailed description will be provided.

The bus-bar frame 150 is disposed to cover the cell assembly 100, and a bus bar 130 may be fixed to the bus-bar frame 150. The bus-bar frame 150 includes a lead slot that is formed of an insulator and electrode leads 105 (shown in FIG. 4) drawn out from the cell assembly 100 can be passed therethrough, and the bus bar 130 may electrically connect the electrode leads 105 (shown in FIG. 4) of the cell assembly 100.

Various other electrical parts may be attached to the bus-bar frame 150. For example, an internal circuit board (ICB) and a battery management system (BMS) may be provided in the bus-bar frame 150, and the electric parts such as ICB and the BMS may be electrically connected with the plurality of battery cells.

The upper plate 140 is disposed on an upper portion of the cell assembly 100, and the bus-bar frames 150 may be pivotably provided at opposite sides thereof. In this case, the bus bar 130 is mounted to the bus-bar frame 150, and a flexible printed circuit board (FPCB) 145 may be disposed on an upper end along a length direction of the upper plate 140.

Since the flexible printed circuit board 145 is electrically connected with the bus bar 130, over-voltage and over-current of the battery cell can be sensed therethrough, and a connector 160 is connected to one end of the flexible printed circuit board 145 such that a signal related to voltage sensing and temperature sensing may be transmitted to or received from a controller provided outside the battery module 10.

Figure 2:
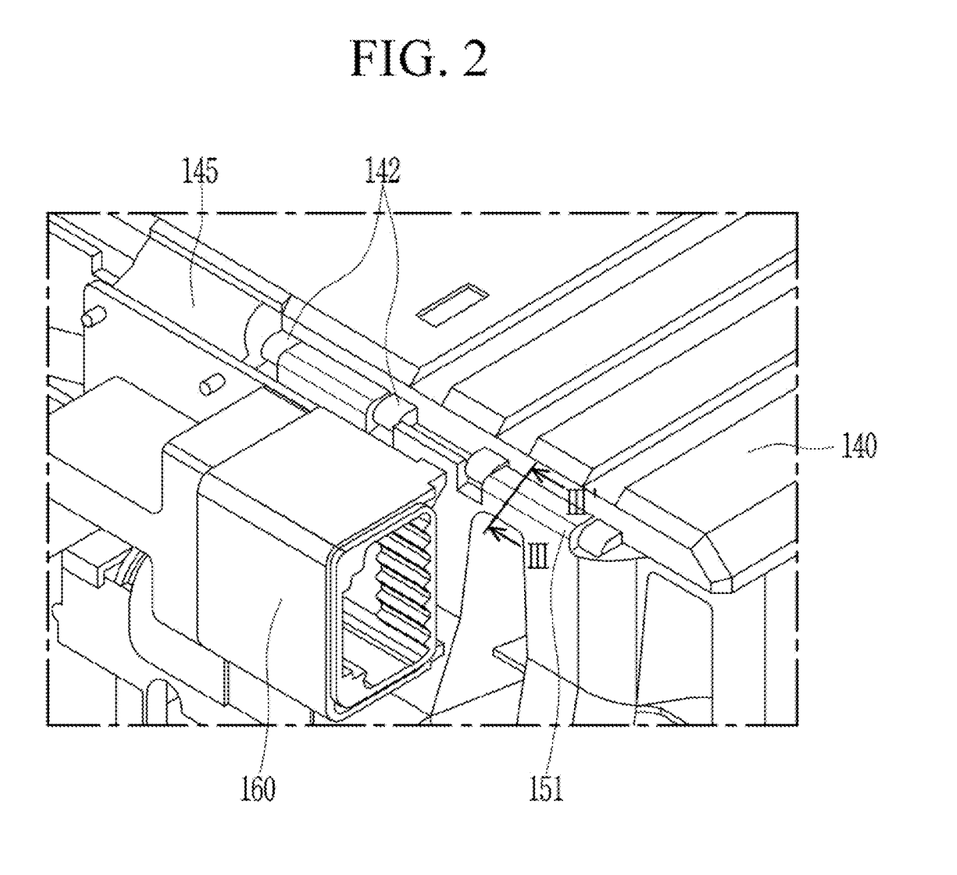
FIG. 2 is an enlarged view of the part A in FIG. 1.
Figure 3:
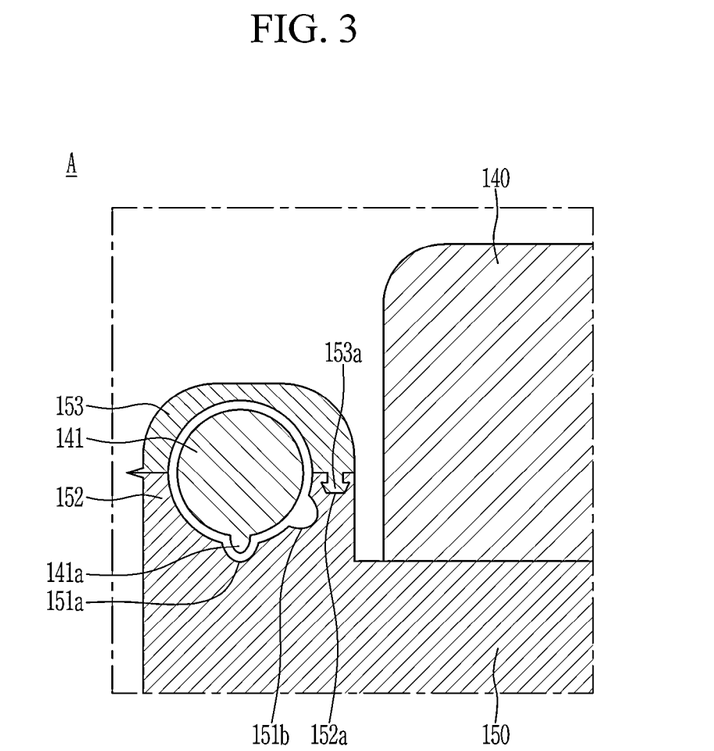

FIG. 2 is an enlarged view of the part A in FIG. 1, and FIG. 3 is a cross-sectional view of FIG. 1, taken along the line III-Ill' in FIG. 2.

Referring to FIGS. 1-3, the upper plate 140 and the bus-bar frame 150 may be coupled by a hinge structure as shown in the part A.

Specifically, the upper plate 140 includes a hinge pin 141 in at least one corner thereof. The hinge pin 141 is coupled to a hinge coupling portion 151 of the bus-bar frame 150, and is disposed between a pair of hinge pin supporting portions 142 protruded in a direction that is parallel with the top surface of the upper plate 140 from the at least one corner of the upper plate 140. One or more hinge pins 141 and hinge pin supporting portions 142 may be provided, and preferably two or more may be provided on one corner of the upper plate 140.

The bus-bar frame 150 includes the hinge coupling portion 151 that is coupled to the hinge pin 141. The hinge coupling portion 151 protrudes in a direction that is parallel with one side of the bus-bar frame 150 from a corner or the bus-bar frame 150, and as the hinge coupling portion 151 and the hinge pin 141 are coupled to each other, the upper plate 140 and the bus-bar frame 150 may be coupled while forming a right angle.

The hinge coupling portion 151 may include a hinge pin receiving portion 152 where the hinge pin 141 is received, and a hinge pin cover portion 153 that covers the hinge pin 141. The hinge coupling portion 151 is formed on a corner of the hinge pin 141, and includes a cylindrical surface corresponding to the shape of the hinge pin 141 such that the hinge pin 141 may be received therein. The hinge pin cover portion 153 is formed to completely cover the hinge pin 141 placed on the hinge pin receiving portion 152, is pivotably formed at a portion that contacts the hinge pin receiving portion 152, and may be coupled with the hinge pin receiving portion 152 through a snap fit structure at the opposite side. For example, as shown in FIG. 3, a snap fit groove portion 152a is formed at an end of the hinge pin receiving portion 152 and a snap fit protrusion portion 153a is formed at an end of the hinge pin cover portion 153 such that the hinge pin 141 can be completely coupled by coupling of the snap fit groove portion 152a and the snap fit protrusion portion 153a. However, the present structure is not limited thereto, and positions of the snap fit groove portion and the groove portion may be changed as necessary. As shown in the drawing, only one end may be formed in a snap fit structure, or both ends may be formed in a snap fit structure. In addition, it can be coupled by a method such as plastic welding, rather than a snap fit structure, and is not particularly limited as long as the hinge pin 141 is completely surrounded.

As described, as the hinge coupling portion 151 completely surrounds the hinge pin 141, the bus-bar frame 150 can be prevented from being separated from the upper plate 140. That is, according to a conventional structure, the hinge pin 141 is exposed to an upper portion of a hinge coupling portion such that the battery module may move or the hinge pin may be separated from the hinge coupling portion in a subsequent process. In this case, the flexible printed circuit board 145 extended to the bus bar frame 150 from the top surface of the upper plate 140 may be torn or cut due to separation between the bus-bar frame 150 and the upper plate 140 caused by separation of the hinge pin. However, according to the structure of the present exemplary embodiment, the hinge pin 141 is completely surrounded by the hinge coupling portion 151 such that the separation between the bus-bar frame 150 and the upper plate 140 can be prevented, and accordingly, damage to the flexible printed circuit board 145 can be prevented. In addition, when the hinge pin 141 is completely surrounded, the hinge coupling portion 151 includes an additional hinge pin cover portion 153 that covers the hinge pin 141 so that convenience in assembly can be maintained.

Figure 4:
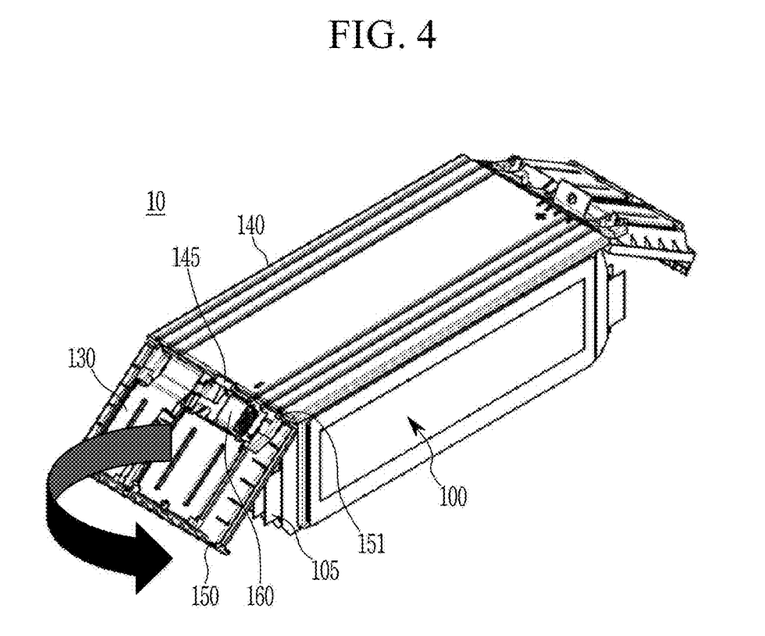
FIG. 4 shows an assembled state of the battery module according to the exemplary embodiment of the present invention.
Figure 5:
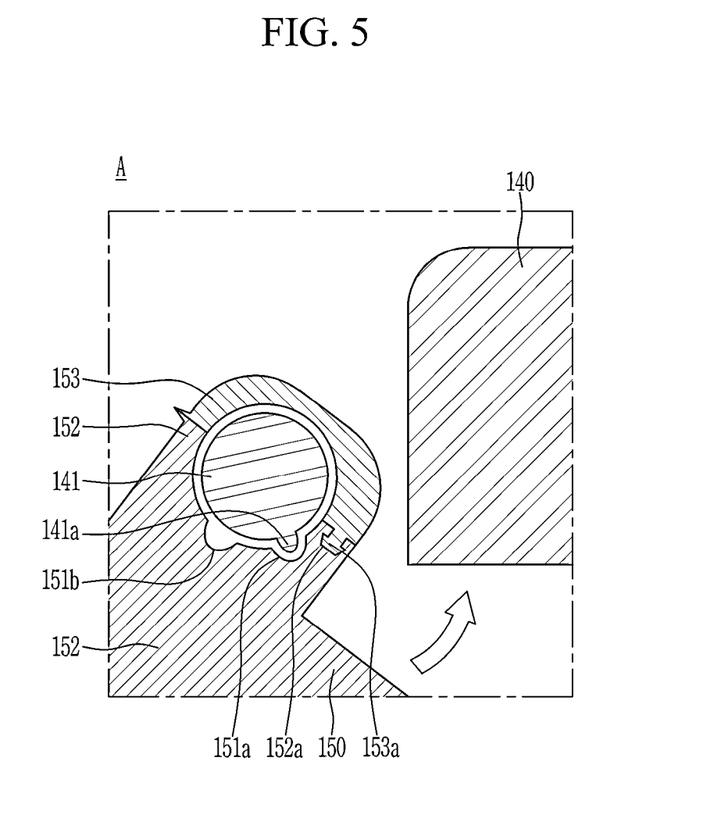
FIG. 5 is an enlarged view of an assembly process of the battery module according to the exemplary embodiment of the present invention.

FIG. 4 shows an assembled state of the battery module according to the exemplary embodiment of the present invention, and FIG. 5 is an enlarged view of an assembly process of the battery module according to the exemplary embodiment of the present invention.

Referring to FIG. 3 to FIG. 5, in the battery module 10 according to the present exemplary embodiment, the hinge pin 141 includes a coupling protrusion portion 141a, and coupling groove portions 151a and 151b that correspond to the coupling protrusion portion 141a may be formed in one of the hinge pin receiving portion 152 and the hinge pin cover portion 153. In addition, the coupling groove portions 151a and 151b may include a main coupling groove portion 151a and a preliminary coupling groove portion 151b that is disposed at a distance from the main coupling groove portion 151a.

Specifically, the coupling protrusion portion 141a of the hinge pin 141 and the main coupling groove portion 151a (it is illustrated to be formed in the hinge pin receiving portion 152 in the present exemplary embodiment) formed in the hinge pin receiving portion 152 or in the hinge pin cover portion 153 are coupled to each other in a state of being assembled while forming the right angle. In a state that the coupling protrusion portion 141a is mounted to the main coupling groove portion 151a, pivoting of the bus-bar frame 150 is limited, and thus stability in assembly can be maintained, and when the upper plate 140 and the bus-bar frame 150 are assembled, even if a worker's skill level is low, the pivoting stops at the correct position, enabling precise assembly. In particular, when the bus-bar frame 150 pivots at a right angle or higher, it may interfere with the inner cell assembly 100 and cause damage to the cell assembly 100, and according to the present exemplary embodiment, the coupling protrusion portion 141a is coupled to the main coupling groove portion 151a such that the bus-bar frame 150 can be prevented from pivoting over a right angle, thereby preventing damage to the cell assembly 100.

As shown in FIG. 4, the bus-bar frame 150 is configured to be able to pivot around the hinge pin 141 while the hinge coupling portion 151 and the hinge pin 141 are coupled. In this case, as shown in FIG. 5, the coupling protrusion portion 141a formed in the hinge pin 141 is mounted to be coupled with the preliminary coupling groove portion 151b formed in the hinge coupling portion 151, and then the snap fit protrusion portion 153a is coupled to the snap fit groove portion 152a such that the hinge pin 141 is covered by the hinge pin cover portion 153. In this case, a portion where the hinge pin receiving portion 152 and the hinge pin cover portion 153 contact each other may be formed to be foldable by reducing a thickness of plastic as shown in FIG. 5, formed by introducing another hinge structure, or formed by introducing a snap fit structure.

Even in a pre-assembled state before the cell assembly 100 is mounted in a space formed by the upper plate 140 and the bus-bar frame 150, work such as moving parts can be stably carried out without releasing the coupling between the upper plate 140 and the bus-bar frame 150.

Next, the bus-bar frame 150 pivots in the direction of the arrow. In this process, the coupling between the preliminary coupling groove portion 151b and the coupling protrusion portion 141a is released, and since the hinge coupling portion 151 is formed of a plastic injection-molded material, the inside of the hinge coupling portion 151 is forced to be slightly opened by an external force during the pivoting process such that the coupling protrusion portion 141a deviates from the preliminary coupling groove portion 151b and the coupling protrusion portion 141a can pivot (tightly fitted shape). When the coupling protrusion portion 141a meets the main coupling groove portion 151a by pivoting, the coupling protrusion portion 141a is received inside the main coupling groove portion 151a. Then, the pivoting of the bus-bar frame 150 is stopped, and the bus-bar frame 150 and the top plate 140 can be coupled while forming a right angle.

In this case, a distance between the preliminary coupling groove portion 151b and the main coupling groove portion 151a may be adjusted such that the bus-bar frame 150 may pivot within 90 degrees until the bus-bar frame 150 is perpendicularly coupled with the upper plate 140 from a state of being initially assembled to the upper plate 140. That is, when the cross-section of the hinge coupling portion 151 has a circular shape, a separation distance between the main coupling groove portion 151*a* and the preliminary coupling groove portion 151*b* may be less than ¼ of a circular arc of the circular-shaped cross-section. The distance can be adjusted depending on a work environment such as a working space, and a pivoting distance of the bus-bar frame 150 may be reduced as the distance is reduced.

As described, according to the exemplary embodiment of the present invention, the flexible printed circuit board and the like can be prevented from being damaged due to separation between the bus-bar frame and the upper plate by the structure of completely covering the hinge pin, and precise assembly of the bus-bar frame and the upper plate can be easily carried out by the coupling of the hinge coupling portion, the coupling protrusion portion formed in the hinge pin, and the coupling groove portion.

Further, even in a pre-assembled state of the bus-bar frame 150 and the upper plate 140, which is a delivery state before the cell assembly 100 is built therein, damage to parts such as a flexible printed circuit board due to separation between the bus-bar frame 150 and the upper plate 140 or deformation in the coupling angle can be prevented.

Figure 6:
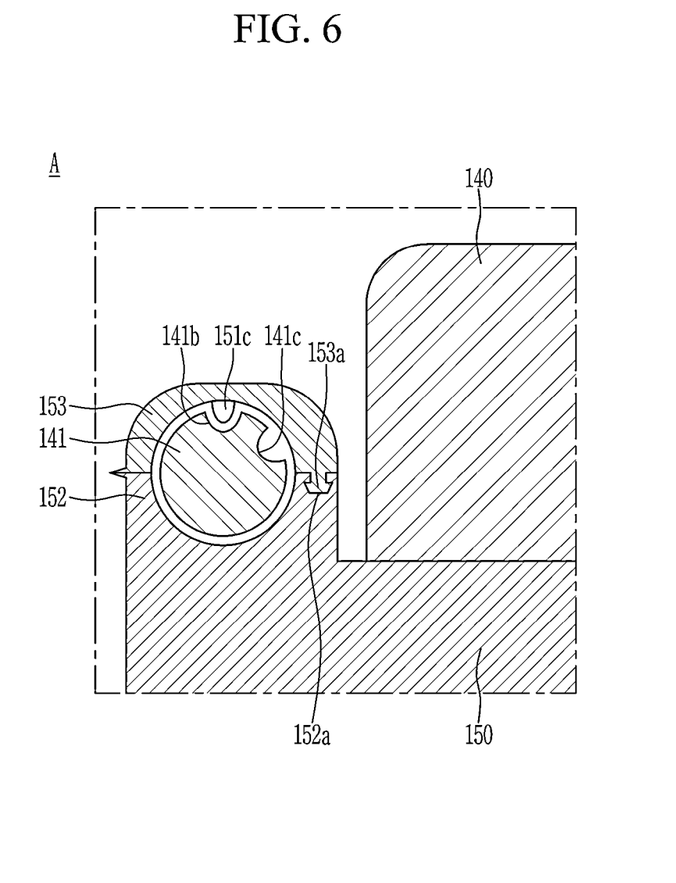
FIG. 6 illustrates features according to another exemplary embodiment of the present invention.

FIG. 6 illustrates features according to another exemplary embodiment of the present invention.

Referring to FIG. 6, a battery module according to another exemplary embodiment of the present invention is different from the battery module of the above-described exemplary embodiment in that a coupling protrusion portion 151*c* is formed in a hinge pin cover portion 153 of a bus-bar frame 150, and coupling groove portions 141*b* and 141*c* are formed in a hinge pin 141 of an upper plate 140.

That is, as shown in FIG. 6, since the coupling groove portions 141*b* and 141*c* are formed in the hinge pin 141, the present exemplary embodiment can be applicable to an assembly environment that is different from the assembly environment of the above-described exemplary embodiment.

In this case, the coupling groove portions 141*b* and 141*c* of the hinge pin 141 also include a main coupling groove portion 141*b* and a preliminary coupling groove portion 141*c*, and a distance between the main coupling groove portion 141*b* and the preliminary coupling groove portion 141*c* may be adjusted such that the bus-bar frame 150 may pivot within 90 degrees until the bus-bar frame 150 is perpendicularly coupled with the upper plate 140 from a state of being initially assembled to the upper plate 140. That is, when the cross-section of the hinge pin 141 has a circular shape, a distance between the main coupling groove portion 141*b* and the preliminary coupling groove portion 141*c* may be less than ¼ of a circular arc of the circular-shaped cross-section. The distance can be adjusted depending on a work environment such as a working space, and a pivoting distance of the bus-bar frame 150 may be reduced as the distance is reduced.

As described, positions of the coupling protrusion portion 151*c* and the coupling groove portions 141*b* and 141*c* may be appropriately selected depending on the assembly sequence or method, and the position is not particularly limited as long as the coupling protrusion portion 151*c* and the main coupling groove portion 141*b* are coupled at a position where the bus-bar frame 150 and the upper plate 140 are assembled at a right angle.

Meanwhile, one or more of the battery modules according to the exemplary embodiment of the present invention may be packaged in a pack case to form a battery pack.

The battery module described above and the battery pack including the same can be applied to various devices. The device may be applied to a transportation means such as an electric bicycle, an electric vehicle, a hybrid vehicle, and the like, but the present invention is not limited thereto, and can be applied to various devices that can use a battery module and a battery pack including the same, and this also belongs to the scope of the present invention.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

10: battery module
100: cell assembly
105: electrode lead
130: bus bar
140: upper plate
141: hinge pin
142: hinge pin supporting portion
141*a*, 151*c*: coupling protrusion portion
145: flexible printed circuit board
150: bus-bar frame
151: hinge coupling portion
151*a*, 141*b*: main coupling groove portion
151*b*, 141*c*: preliminary coupling groove portion
152: hinge pin receiving portion
153: hinge pin cover portion
152*a*: snap fit groove portion
153*a*: snap fit protrusion portion
160: connector

The invention claimed is:

1. A battery module comprising:
a cell assembly that includes at least one battery cell;
an upper plate that covers one side of the cell assembly, and includes a hinge pin at at least one corner thereof; and
a bus-bar frame that covers a neighboring side of the one side of the cell assembly, covered by the upper plate, and that is coupled to the upper plate by including a hinge coupling portion that is coupled with the hinge pin,
wherein the hinge coupling portion comprises a hinge pin receiving portion where the hinge pin is received and a hinge pin cover portion that covers the hinge pin, and
one of the hinge pin and the hinge coupling portion comprises a coupling protrusion portion, and the other comprises a coupling groove portion corresponding to the coupling protrusion portion.

2. The battery module of claim 1, wherein the hinge pin cover portion completely covers the hinge pin.

3. The battery module of claim 1, wherein the coupling groove portion comprises a main coupling groove portion, and a preliminary coupling groove portion disposed a distance apart from the main coupling groove portion.

4. The battery module of claim 3, wherein the hinge pin comprises the coupling protrusion portion, and the hinge coupling portion comprises the main coupling groove portion and the preliminary coupling groove portion.

5. The battery module of claim 4, wherein the hinge coupling portion has a circular-shaped cross-section, and the distance between the main coupling groove portion and the preliminary coupling groove is less than ¼ of a circular arc of the circular-shaped cross-section.

6. The battery module of claim 3, wherein the bus-bar frame is pivotably coupled to the upper frame by the hinge coupling portion.

7. The battery module of claim 6, wherein pivoting of the bus-bar frame is limited by coupling between the coupling protrusion portion and the main coupling groove portion.

8. The battery module of claim 6, wherein the bus-bar frame is perpendicularly coupled to the upper plate while the coupling protrusion portion and the main coupling groove portion are in a coupled state.

9. The battery module of claim 6, wherein the cell assembly is mounted below the upper plate in a preliminary coupling state in which the coupling protrusion portion and the preliminary coupling groove portion are coupled, and the bus-bar frame is assembled to cover the neighboring side of the one side of the cell assembly by pivoting of the bus-bar frame.

10. The battery module of claim 1, wherein the hinge pin receiving portion and the hinge pin cover portion are coupled by a snap fit structure.

11. The battery module of claim 1, further comprising a flexible printed circuit board formed on a top surface of the upper plate, wherein the flexible printed circuit board extends from one side of the upper plate adjacent to the hinge coupling portion to one side of the bus-bar frame passing one side adjacent to the hinge coupling portion.

12. The battery module of claim 3, wherein the hinge coupling portion comprises the coupling protrusion portion, and the hinge pin comprises the main coupling groove portion and the preliminary coupling groove portion.

13. The battery module of claim 12, wherein the hinge coupling portion has a circular-shaped cross-section, and a distance between the main coupling groove portion and the preliminary coupling groove is less than ¼ of a circular arc of the circular-shaped cross-section.

14. A battery pack comprising:

at least one battery module according to claim 1; and a pack case that packages the at least one battery module.

15. A device comprising at least one battery pack of claim 14.

* * * * *